US007783552B2

United States Patent
Assia et al.

(10) Patent No.: US 7,783,552 B2
(45) Date of Patent: Aug. 24, 2010

(54) METHOD AND SYSTEM FOR REPRESENTING FINANCIAL INFORMATION IN A GAMING ENVIRONMENT

(75) Inventors: Johnathan Assia, Tel Aviv (IL); Ronen Assia, Tel Aviv (IL); David Ring, Tel Aviv (IL)

(73) Assignee: Tradonomi Ltd., Tortola (VG)

( * ) Notice: Subject to any disclaimer, the term of this patent is extended or adjusted under 35 U.S.C. 154(b) by 0 days.

(21) Appl. No.: 11/814,597

(22) PCT Filed: Feb. 7, 2006

(86) PCT No.: PCT/IL2006/000149

§ 371 (c)(1),
(2), (4) Date: Jul. 24, 2007

(87) PCT Pub. No.: WO2007/091234

PCT Pub. Date: Aug. 16, 2007

(65) Prior Publication Data

US 2008/0275824 A1 Nov. 6, 2008

(51) Int. Cl.
*G06Q 40/00* (2006.01)

(52) U.S. Cl. .................. 705/36 R; 705/35; 705/37; 463/9; 463/16; 463/25

(58) Field of Classification Search ............ 705/35, 705/36 R, 37; 463/9, 16, 25
See application file for complete search history.

(56) References Cited

U.S. PATENT DOCUMENTS

| 3,980,307 | A | 9/1976 | Raub |
| 4,363,489 | A | 12/1982 | Chodak et al. |
| 5,139,269 | A | 8/1992 | Peterson |
| 5,934,674 | A | 8/1999 | Bukowsky |
| 6,497,410 | B1 | 12/2002 | Bernstein et al. |
| 6,839,686 | B1 | 1/2005 | Galant |
| 6,884,170 | B2 | 4/2005 | Rowe |
| 6,890,179 | B2 | 5/2005 | Rogan et al. |
| 7,040,982 | B1 * | 5/2006 | Jarvis et al. ............ 463/9 |
| 7,233,922 | B2 * | 6/2007 | Asher et al. ............ 705/36 R |
| 2003/0211883 | A1 | 11/2003 | Potts |
| 2004/0210507 | A1 * | 10/2004 | Asher et al. ............ 705/37 |
| 2005/0187020 | A1 | 8/2005 | Amaitis et al. |

OTHER PUBLICATIONS

Benoit B Mandelbrot, Scaling in financial prises: III. Cartoon Brownian motions in multifractal time, Mar. 22, 2001, Institute of Physics Publishing, Quantitative Finance, vol. 1, (2001) 427-440.*
International Preliminary Report on Patentability and the Written Opinion of the International Searching Authority dated May 16, 2007, from corresponding International Application No. PCT/IL2006/000149.

* cited by examiner

*Primary Examiner*—Behrang Badii
(74) *Attorney, Agent, or Firm*—Katten Muchin Rosenman LLP

(57) ABSTRACT

An apparatus, method and data structure for procuring and analyzing information, regarding the financial markets and a system to execute financial transactions using Internet-based front end graphics that resembles casino games and betting games. The system provides a comprehensive combination of financial information and transactions in a format that facilitates known and new casino/betting like front end graphics.

27 Claims, 4 Drawing Sheets

METHOD AND SYSTEM FOR REPRESENTING FINANCIAL INFORMATION IN A GAMING ENVIRONMENT

FIELD OF THE INVENTION

The present invention generally relates to a combination of on-line financial trading and on-line gaming, and in particular to a method and system for representing financial and securities information and financial transactions in a gaming environment.

BACKGROUND OF THE INVENTION

Today's financial online trading evolved over the last 10 years from traditional brokerage houses. With the rapid development and popularity of the internet, growth of electronic online trading has been extraordinary. Nevertheless the interface of the various trading platforms has generally remained unchanged over the last years and relies for the most part on the same tools that have been available in an offline format. Some on-line trading also incorporates several technical analytical tools that are generally displayed upon a simple time-line price/volume graph. Some research advancements have been made in the field of visualizing stock market data, but to this date none of it has had significant impact on the way trading works.

Speculative day trading represents a significant share of the whole trading industry. The online trading market offers various financial instruments such as stocks, foreign exchange, bonds and long-term securities and various forms of option trading. Each of these tools has several multi-billion market leaders (e.g., E-trade, Ameritrade®, Charles Schwab®, etc.).

On-line trading platforms offer the users exact financial information on securities or derivatives and tools to create specific transactions upon the underlying security. These tools are generally implemented as dynamic Web-sites or downloadable software.

The transactions are in the form of buy/sell orders related to a specific security that the user queries, and can have several purely financial parameters such as stop/loss, margin, short sell etc.

The foreign exchange market (also called "forex") is the largest and most dynamic market. Nearly 1.8 Trillion dollars are traded everyday. In the foreign exchange market, the on-line retail brokers have been increasing market share in the overall daily turnover.

Forex brokers are firms that deal in foreign exchange. The foreign exchange market is quite similar to the equity markets, except that typical forex brokers do not charge a commission and are required to hold a special license. Forex brokers earn money from the spread (also called "pip"). The spread is the difference between the prices at which a currency is bought and sold. A pip is the smallest price increment in a currency. For example, in Euro/US Dollar (EUR/USD), a move from 0.9008 to 0.9009 is one pip. In US Dollar/Japanese Yen (USD/JPY), a move from 127.41 to 127.42 is one pip. Several leading foreign exchange brokers also offer software interfaces to automate trading, including ONADA and Gain capital.

Today's online gaming industry has arisen mostly in the last 5 years. The gaming industry is divided into several market segments:

1. Classic casino games such as roulette, slot machines, black jack, etc. (i.e.—Market Leader Casino-on-net, www.888.com)
2. Betting on various sport events.
3. Skilled and semi-skilled games such as Poker, chess and backgammon; (i.e.—Market Leader PartyGaming)
4. New games.

On-line Casino games offer the user the opportunity to play a game over the Internet. The user interface consists of games such as horse racing, slot machines, roulette and card games. All these games depend on random variables (excluding sport betting). The user can play the game and the game outcome will be determined using a computer based algorithm to select a random outcome of the game. The algorithm (also known as Random Numbers Generator) usually has fixed odds to determine the Payoff of the gamer (and the gain of the house). For example, the slot machines algorithm can determine that the overall return to gamers will be 95% of all the bets, so the house will earn 5% of all the bets.

The graphic user interface (GUI) of these games does not necessarily depend on the random algorithm or the game outcome. For example a roll of the dice can be in a fixed manner, where only the last frame of the dice roll will represent the outcome of the random algorithm.

Although both the gaming and the trading industry rely in part on speculation, they hold uniquely different characteristics:

1. Trading companies are regulated and require licensing, while on-line gaming and betting have legal issues in some countries and are considered gambling.
2. Most on-line trading applications have sophisticated usability and a standard user interface mainly for informing the user of price changes, while the on-line gaming applications are rich in color, innovative formats and complex graphics.
3. Online Games have short-time durations, often less than 5 minutes per game, while on-line trading provide for longer durations and a position that can be held for an unlimited time.
4. The marketing efforts and client target segments also differ. The trading companies target and reach a financially educated audience (Day traders) and compete over trading costs and user functionality. The gaming industry aims at the less educated, addictive audience.

Several companies offer the ability to place bets on the outcome of different financial instruments, often referred to as financial spread/binary betting. Financial Spread betting gives investors the opportunity to trade on the financial markets without ever taking physical ownership of the underlying instrument. This means that the trader can speculate in the direction of any financial instrument, whether it is specific shares, currencies, commodities or indices without ever owning them. For example a trader can place a bet of $10 per point on the NASDAQ, and the bet is settled as the difference between the purchase and the sell price multiplied by $10. Most of these companies operate mainly in the UK, and are considered betting companies. In the US there is no regulation for betting companies. The user interface of these instruments is similar to on-line trading, mostly based on dynamic web-pages and has an informative look.

The present invention recognizes the similarities between the online gaming and the online trading industries, and addresses the need of users for simpler and more appealing graphic representation of the financial information.

The present invention also addresses the legal issues of the on-line gaming industry, and offers gamers a regulated financial alternative for their gaming needs.

REFERENCES CITED

Gaming related
U.S. Pat. No. 3,980,307—Stock market game apparatus
U.S. Pat. No. 4,363,489—Electronic stock market terminal game
U.S. Pat. No. 5,139,269—Financial game apparatus
U.S. Pat. No. 5,934,674—Stock market game
U.S. Pat. No. 6,497,410—Trading cards for an investment game, and game and method thereof
U.S. Pat. No. 6,839,686—Method and system for providing financial information and evaluating securities of a financial debt instrument
U.S. Pat. No. 6,890,179—Interactive games for teaching financial principles
U.S. Pat. No. 6,884,170—Method and apparatus for graphically portraying gaming environment and information regarding components thereof.

A method and apparatus for providing a graphical representation of a gaming environment and for providing information regarding individual components located in the environment is provided. A graphical user interface displays a graphical representation of at least a portion of a gaming environment, such as a graphical representation of individual components of a gaming system and their surrounding physical environment. The components are graphically portrayed in positions corresponding to the relative positions of the actual components of the gaming system. By selecting a graphically represented component, information regarding the actual gaming system component which is represented is provided, such as by display in a window associated with the graphical user interface. Gaming system component or other information may be obtained via a communication link from those components.

Financial trading related prior art includes U.S. Pat. No. 6,709,330, Stock Simulation Engine for an Options Trading Game, which discloses an options simulation engine for an options trading game. The present invention comprises a game engine for keeping track of game time and game settings, an options market simulator for providing a real-world options trading environment, and a portfolio manager engine for keeping track of a player's portfolio. The options market simulator comprises a basic stock price generator for moving stock prices, a news/rumor generator for moving stock prices, and an options pricing generator for pricing options. The portfolio manager comprises an available cash/minimum balance mechanism for determining how much a player is charged for buying and/or selling options and stocks, and for maintaining a player's positions, a risk analysis mechanism for determining the amount of money a player can lose for any given stock or option, a margin requirements mechanism for keeping track of the minimum equity required in a player's account to support the player's total investment position, a profit and loss mechanism for determining a player's profit and loss throughout the game and on a weekly basis, and a trading rules/limitations mechanism that prevents a player from breaking a trading rule or exceeding a limitation during game play.

Other Prior Art Includes:
U.S. Pat. No. 6,390,472, a Pseudo-Commodities Interactive Futures Trading Game;
U.S. Pat. No. 6,347,307, a System and Method for Conducting Web-based Financial Transactions in Capital Markets; and
U.S. Pat. No. 6,249,770, which discloses a Method and System of Financial Spreading and Forecasting.
U.S. pat. application No. 20050197938 A System and Method for Determining Odds for Wagering in a Financial Market Environment. This patent mainly discloses a means to protect the way of determining odds.
US pat. Application No 20050027643 A System and Method for Wagering Based on the Movement of Financial Markets. This invention provides creation of financial-like instruments that are determined by casino games. i.e., a "stock" is created, wherein the price is determined by the movements of casino games.

Thus, it would be advantageous to have a method and a system to combine these fields into a financial game having the look and feel of casino-like games, but which is based on financial instruments such as securities derivatives.

SUMMARY OF THE INVENTION

Accordingly, it is a principal object of the present invention to provide a financial gaming environment having the look and feel of casino-like games, which are based on financial instruments such as security derivatives and foreign exchange.

The term financial instrument is used to describe any financial security or derivative that might be traded on a financial exchange, for example company stocks or bonds, market indices (such as NASDAQ, FTSE, DOW . . . ), commodities (Gold, Silver and other common and less common commodities), foreign exchange rates (EUR/USD, GBP/USD and any other currency pair).

The term financial information is used to describe the market data such as price, volume, ask/bid and any market data indicator of stocks, currencies, ratios, securities, derivatives and any other financial instrument.

The term financial game is used to describe a game logic and graphic representation of financial information of several financial instruments. The game logic includes the translation of the financial information to graphic elements, the algorithms and logic to translate the user game action to financial transactions, and the algorithm used for calculating the user Profit/Loss from the financial game.

It is yet another principle object of the present invention to embody the concept of users playing a betting and/or casino game (racing, roulette, etc.), wherein the outcome is determined by the movements of financial markets (currencies, exchanges etc).

Prior art patents provide betting on the outcomes of financial data and other market information, but do not employ a gaming-like interface in order to perform financial transactions.

It is another object of the present invention to provide a graphically rich, colorful and engaging environment of the gaming world translated using computer algorithms to financial information and transactions.

It is a further object of the present invention to combine several financial instruments to create a very short time profit/Loss model, which depends on the movement of several securities. For example, one might assume that during the next trading minute the dollar will move higher relative several other currencies. The user can trade a short time trade on the dollar and gain any changes relative to other currencies in the following minute.

The present invention includes various methods and systems for graphically representing a gaming environment using financial information. Optional and alternative embodiments of the present invention include methods and systems for providing transaction tools that create financial transactions through graphical representation of the gaming environment.

A preferred embodiment of the invention includes a graphical user interface for displaying a graphical representation of financial information in a gaming environment, such as horse racing, slot machines, roulette sport betting, card games or any other known or new gaming system.

A preferred embodiment of the invention includes a module to calculate the evaluation of fixed micro-time scaled (such as 1, 5, 10, 15 minutes and more) options to evaluate the risk of the trade and the commission and margin level of the user. For example, consider an option for buying $100K EUR/USD Spot for 1 minute at market prices. Since the user takes the risk for only 1 minute, its premium should be lower than a regular long-term position.

A preferred embodiment of the invention includes a financial server to collect the transactions of the financial game. The financial server can then be used to aggregate the order flow of the financial transactions and remove opposite trades (a buy and sell transaction of the same financial instrument can be disregarded), to reduce the actual financial transactions costs for the company.

The invention also includes computer algorithms for translating financial information to graphic coordinates and parameters that can then be displayed as a game on a graphical user interface (GUI). The system receives user actions related to the game, then translates the user game actions into financial transactions and sends these transactions to a financial transaction server for execution.

In an exemplary embodiment the game graphics and application reside on the user computer, and send specific commands to the financial-gaming server game over a communications link, such as a voice protocol network (VPN), a dial-up modem, the Internet or any communication link between the user computer and the financial-gaming server.

A few financial games are described below as non-limiting examples:

Forex Racing:

The game has a horse racing look and feel with each horse representing a country's specific currency (Dollar $, Euro E, GBP, etc.).

The race starts at a specific time and all the horses (currencies) are at the same starting point. When the race starts the movement of each horse is related to the relative currency movement. For example if the USD rose during the game in relation to all other currencies, then the USD horse will be leading the race.

The game players can bet on which horse will win, or on the order of the winning horses (1st second and third places). After choosing their bet they can watch displays of their possible gains from their bet and the bet cost.

The game action is then translated to a market position using unique algorithms that hedge the player bet to options on the currencies.

When the race ends the winners are announced and the profit/loss is calculated and announced to all the game participants.

For example, a forex race can have the following attributes:
1. Currencies in the game (for example USD, EUR and GBP)
2. Duration of the Race (for example 1 minute).
3. The user can select the amount he wants to trade on the financial game (for example $100) and currencies he thinks will win the race (for example, the USD).

The user action can then be translated for a financial transaction that will correspond with the user selection:

For example, sell $20K of EUR/USD Spot for 1.2000 (the market Bid quote), and sell $20K GBP/USD for 1.7000. The total amount is $100K, which represents a 1:400 margin that the race offers (some foreign exchange brokers offer margins of 1:400 in their on-line trading). The commissions of the transaction can be deducted from the user amount.

During the race, the user can see the 3 horses that represent USD, EUR and GBP move in correspondence to the movement of the currency rates. The user can also view the profit changing during the race that corresponds to his trade and the current prices of the financial transactions. At the end of the race, for example, if the EUR/USD ask price is 1.2005, and the GBP ask price is 1.7005, then the user has a profit of 0.0005*20K+0.0005*20K=$20. The user account balance is then awarded $20.

The user can select different races on different currencies, and different race durations. User actions can be accepted at the beginning of the race or during the race.

The horse race can also be represented in any other racing form, such as greyhounds, race cars or any other suitable racing appearance.

The horses can also represent any other financial instrument such as companies stock, which can be hedged using stock options, or different commodities. A virtual race can represent any possible relation between various securities.

Another example of a financial game can be Stock Machine or Forex Machine. The game looks like a typical virtual Slot machine, where each symbol is replaced either by a currency or a company Symbol. Each reel is defined to have a different set of symbols. Certain combinations of two or more identical symbols that come to a stop at the horizontal line are defined as a winning bet. For example, one reel can represent food industry companies, another represents technological companies and the third represents apparel companies. A match is defined prior to the game and the reels stops at the highest mover during the spinning time of the machine.

Again, winning bets and odds are calculated prior to the game, and the different possibilities of the game are numerous.

Another example of a Financial Game can be Market/Forex Roulette:

The game looks like a Casino roulette game. It can have any amount of numbers or 37 just as in a real roulette. Each number corresponds to a financial instrument or a combination of several financial instruments. The roulette wheel starts to spin, financial instrument price changes during the duration of the game are monitored and the wheel stops at the number that rose the most during the spinning time. For example if the roulette wheel has stocks illustrated on the table such as Microsoft, IBM, Apple, etc., and during the spin of the wheel Microsoft's Stock went up the most then, the ball stops on the Microsoft symbol or number and Microsoft stock is considered the winning number. The winning bets are distributed according to the financial prices of the underlying securities at the end of the game.

In accordance with still another embodiment of the invention, a method of presenting data associated with the value of one or more financial instruments is described.

There has thus been outlined, rather broadly, the more important features of the invention in order that the detailed description thereof that follows hereinafter may be better understood. Additional details and advantages of the inven-

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF AN EXEMPLARY EMBODIMENT

The principles and operation of a method and a system according to the present invention may be better understood with reference to the drawings and the accompanying description, it being understood that these drawings are given for illustrative purposes only and are not meant to be limiting.

Figure 1:
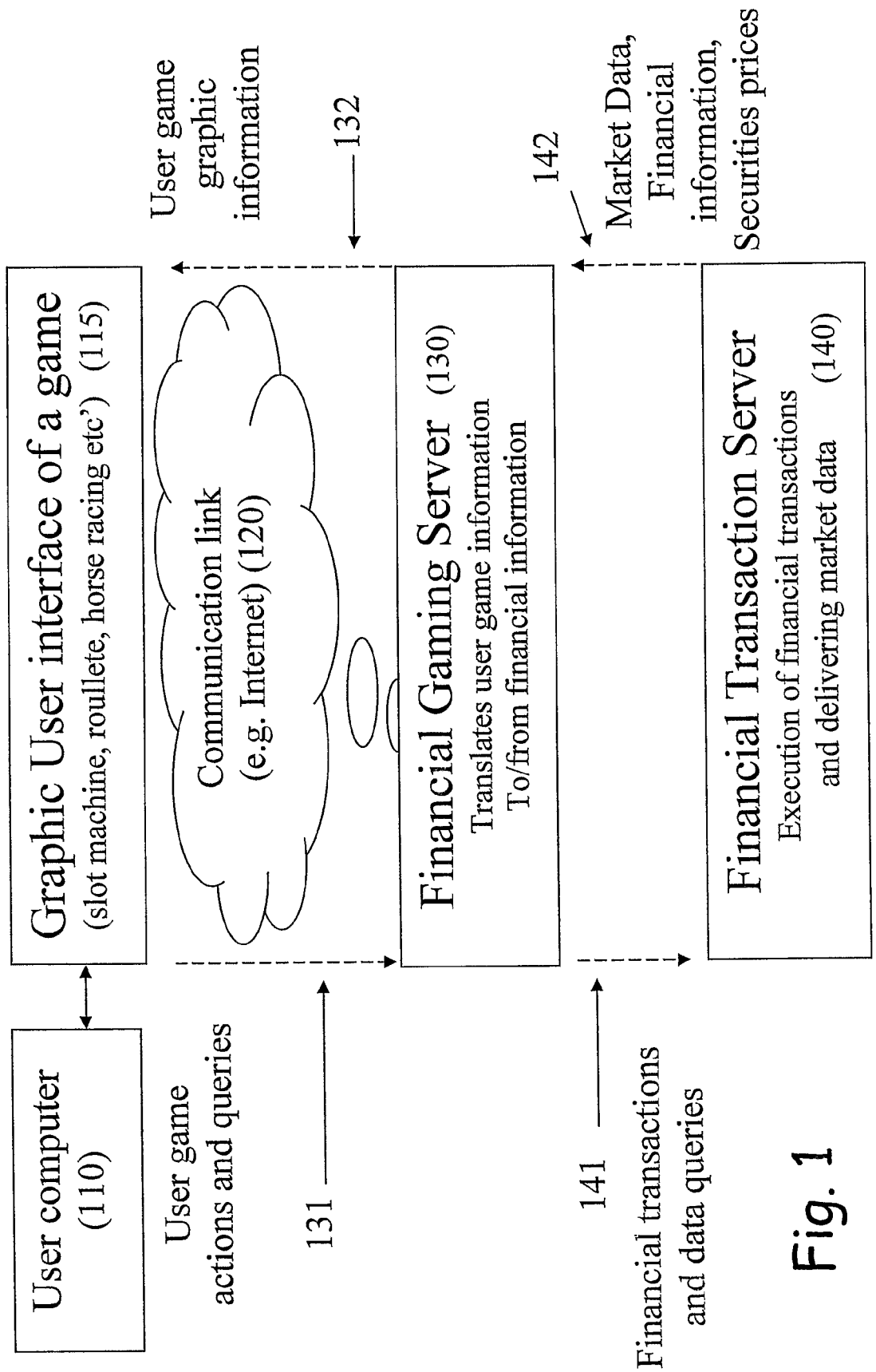
FIG. 1 is a flow diagram graphically representing an exemplary gaming environment and translating the gaming graphics and actions to financial information and transaction.

FIG. 1 is a flow diagram graphically representing a gaming environment and translation of the gaming graphics and actions to financial information and transactions. The graphic user interface (GUI) 115 of a user computer 110 displays a game, such as a slot, roulette or horse racing. User computer 110 communicates via the Internet 120, for example, sending user game actions and queries 131 to a financial gaming server 130, and receiving user game graphic information 132 from financial game server 130. Financial game server 130 thus translates user game information into and from financial information. Financial game server 130 is also in communication with a financial transaction server 140, sending financial transactions 141 and receiving market data, financial information and securities prices 142, for example. Financial transaction server 140 thus executes financial transactions 141 and delivers market data, etc. 142.

Figure 2:
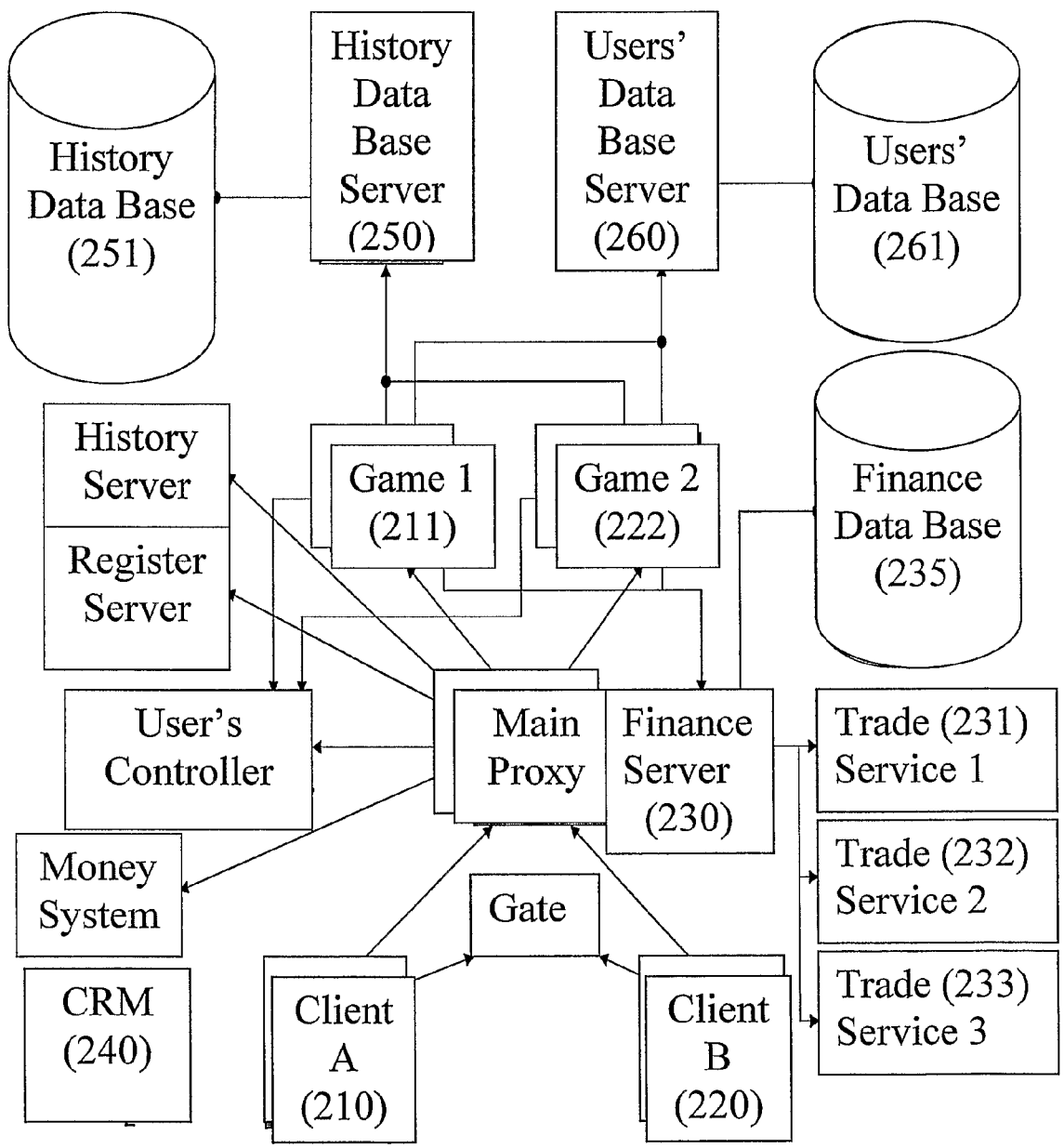
FIG. 2 is an exemplary system architecture diagram representing how multiple clients can play multiple games, deposit money and make transactions.

FIG. 2 is a system architecture diagram representing how multiple clients can play multiple games, deposit money and make transactions. Two clients 210 and 220 are simultaneously playing game 1 211 and game 2 222, respectively. A financial server 230 coordinates games 211 and 22 with trade services 231-233 and a financial data base 235. A customer relations management 240 operates a call center having access to a history data base server 250, a history data base 251, a user's data base server 260 and a user's data base 261.

Figure 3:
FIG. 3 is an exemplary graphic display of a GUI of a horse racing game that relates to the changes in several currencies.

FIG. 3 is an exemplary graphic display of a GUI of a horse racing game that relates to the rate changes of several currencies. Exchange rate change is shown for various currencies 320 with corresponding flags 310 and gain values 330. A horse and jockey 340 are shown moving from left to right. The distance from left to right is proportional to the appropriate exchange rate. The initial amount of investment 360 is shown with the user's selected currency 370 and the current profit 380.

Figure 4:
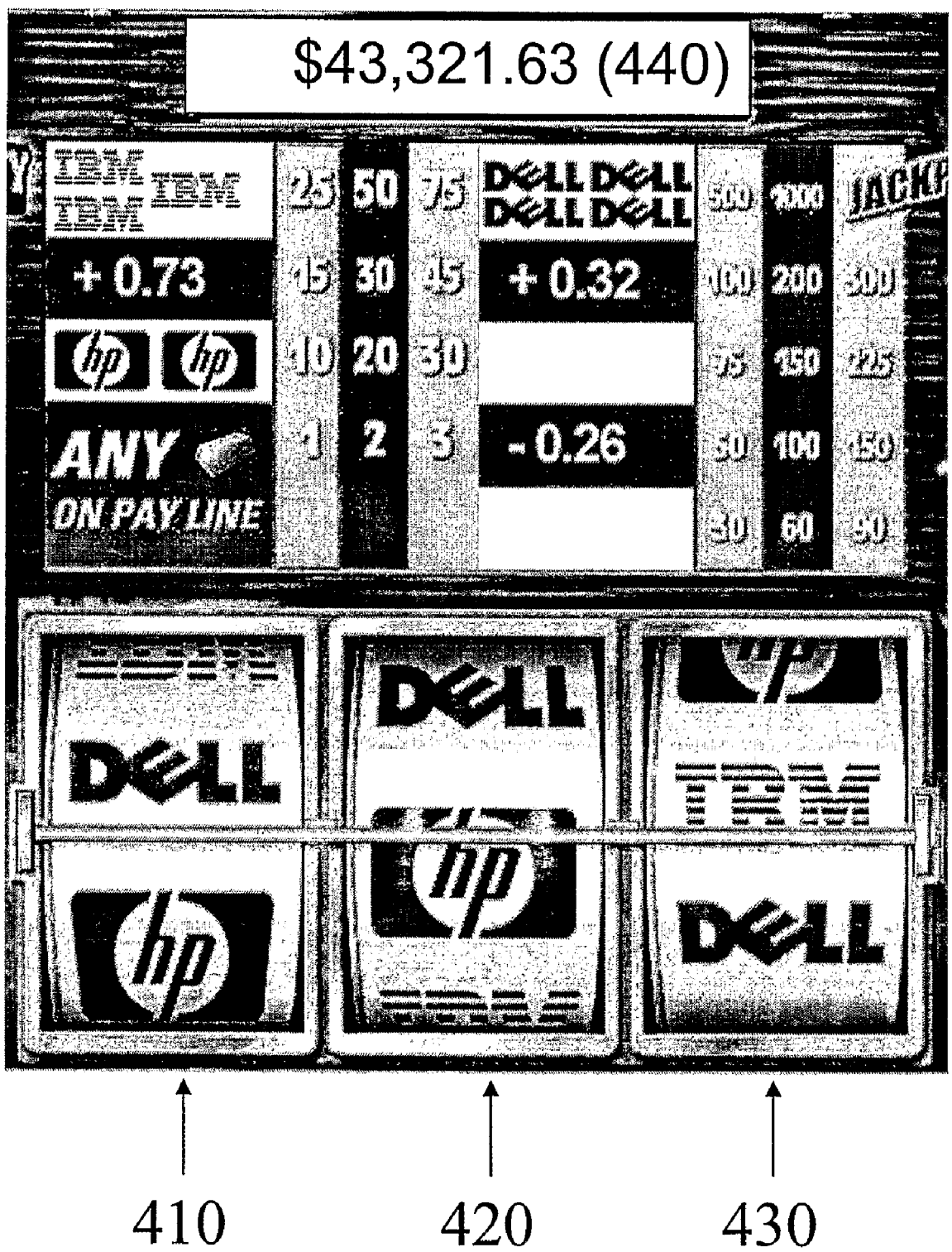
FIG. 4 is an exemplary graphic display a GUI of a slot machine that relates to the movement in prices of several stocks.

FIG. 4 is an exemplary graphic display of a GUI of a slot machine that relates to the movement in prices of several stocks. The three wheels each show logos for Hewlitt-Packard 410, IBM 420 and DELL 430. A window at the top shows a jackpot amount 440.

It is to be understood that the phraseology and terminology employed herein are for the purpose of description, and should not be regarded as limiting.

It is important, therefore, that the scope of the invention is not construed as being limited by the illustrative embodiments set forth herein. Other variations are possible within the scope of the present invention as defined in the appended claims and their equivalents.

We claim:

1. A method of on-line trading of actual financial instruments which are actively traded in the real world financial markets, the trading transactions being transmitted over an electronic network using an electronic communicating device, said method comprising:

receiving at said device over the electronic network a data stream of real-time actual financial information relating to at least one of said actual financial instruments;

generating a graphical game scenario including user game actions, the game comprising gaming elements forming variable aspects of the game;

associating each gaming element with a respective one of said actual financial instruments, and associating related financial information concerning said financial instruments using said user game actions;

correlating at least one of the appearance and position of each gaming element with the actual information in the received data stream of the associated financial instrument;

graphically displaying on a graphic display associated with the device the actual financial information received in the data stream in the format of the graphical game scenario, such that the user visualizes the financial information of the financial instruments only as part of the graphical game scenario;

transforming the user game actions back to associated financial transactions involving each of said financial instruments; and transferring over the electronic network information relating to the financial transactions performed by the user to a financial server such that each of the electronic device users experience a net actual financial result based upon said actual financial information received and user actions performed, thereby enabling on-line trading through the graphical gaming elements.

2. The method of claim 1, wherein said net financial result is real.

3. The method of claim 1, wherein said net financial result is simulated as a game.

4. The method of claim 1, wherein said actual financial information comprises relative changes in the price of the at least one actual financial instrument, wherein a relative change is a mathematical relation between at least two aspects of the at least one actual financial instrument.

5. The method of claim 4, wherein said actual financial information comprise ask/bid prices of at least one financial instrument.

6. The method of claim 4, wherein said actual financial information comprise a market data indicator, said indicator comprising mathematical transformations of said actual financial information.

7. The method of claim 4 wherein said actual financial information comprise a technical indicator, said technical indicator comprising a statistical prediction/suggestion for the future movement of said actual financial information.

8. The method of claim 4, wherein said actual financial information comprise currency ratios, said currency ratios comprising a relation of at least two currency prices.

9. The method of claim 8, wherein said currency ratio is traded via foreign exchange trading.

10. The method of claim 8, wherein said currency ratio comprises several traded ratios.

11. The method of claim 4, wherein said actual financial information comprise security derivative prices and evaluation parameters.

12. The method of claim 11, wherein said evaluation parameters are at least one of: options; forwards; and futures, and wherein said evaluation parameters are the parameters of option elements.

13. The method of claim 12, wherein said actual security derivative prices are quoted from an exchange.

14. The method of claim 12, wherein said actual security derivative prices are calculated via option pricing formulas.

15. The method of claim 1, wherein the graphical game scenario is one of fixed and varying time duration with one of a fixed and varying start time and one of a fixed and varying end time, such that said user actions translate to financial transactions over varying periods of time.

16. The method of claim 1, wherein the method is performed on an electronic device and comprises at least one of:
a computer;
a mobile phone;
a personal digital assistant;
and a kiosk.

17. The method of claim 1, wherein said at least one actual financial instrument is at least one of:
a traded security;
a traded bond;
a traded stock;
a financial derivative that can be traded;
a foreign exchange financial instrument comprising at least one of: spot; forward; and futures; and
a commodity financial instruments comprising at least one of: spot; forward; and futures.

18. The method of claim 1, wherein the graphical gaming scenario comprises at least one of:
slot machines;
roulette;
dice games;
racing;
horse racing;
card games;
Blackjack; and
Poker.

19. A system for facilitating on-line trading of actual financial instruments which are actually traded in the real world financial markets, the user having an electronic device capable of transmitting over an electronic network, said system comprising:
a communicating device capable of receiving over the electronic network a data stream of real-time actual financial information relating to at least one of said actual financial instruments;
a presentation module capable of generating a game scenario including user game actions, the game scenario comprising gaming elements forming variable aspects of the game;
a processor capable of associating each gaming element with a respective one of said financial instruments and associating related financial information concerning said financial instruments using said user game actions;
said processor capable of correlating at least one of the appearance and position of each gaming element with the actual information of the received data stream of the associated financial instrument;
a graphic display capable of graphically displaying the actual financial information received in the data stream in the format of the graphical game scenario such that the user visualizes the financial information of the financial instruments only as part of the graphical game scenario;
said processor capable of transforming the user game actions back to associated financial transactions involving each of said financial instruments; and
the electronic network capable of transferring information relating to the financial transactions performed by the user to a financial server such that each of the electronic device users experiences a net actual financial result based upon said actual financial information received and user actions performed, thereby enabling on-line trading through the graphical gaming elements.

20. The system of claim 19 wherein said processor module provides algorithms to calculate and present:
a. parameters of said gaming element as constituted before entering the game, parameters of said gaming element parameters comprising trade leverage and trade transactions that relate to actions of the graphical game scenario;
b. changes in said gaming elements from said data during the game; and
c. profit/loss of the game during the game.

21. The system of claim 19 wherein said communication device provides a communication link between electronic devices of the users and said processor and comprises at least one of: a voice protocol network (VPN); a dial-up modem; and the Internet.

22. The system of claim 21, wherein the electronic devices are client computers.

23. The system of claim 22, wherein the processor resides at a remote location and the electronic network is the Internet.

24. The system of claim 19, wherein the processor translates said financial information to said gaming elements in real-time using fixed rules.

25. The system of claim 24, wherein the processor translates said financial information to said gaming elements, using algorithms comprising historic and real-time financial information to calculate the evaluation of the transaction in real-time.

26. The system of claim 19, wherein the processor translates the user gaming actions to financial transaction data using fixed rules.

27. The system of claim 19, wherein the processor translates the user gaming actions to financial transaction data, using algorithms that use historic and real-time financial information to calculate the evaluation of the transaction in real-time.

* * * * *